United States Patent [19]

Kawaguchi et al.

[11] Patent Number: 4,715,680
[45] Date of Patent: Dec. 29, 1987

[54] OPTICAL SWITCH

[75] Inventors: Takao Kawaguchi, Moriguchi; Hideaki Adachi, Hirakata; Kentaro Setsune, Sakai; Kenzo Ohji, Ikoma; Kiyotaka Wasa, Nara, all of Japan

[73] Assignee: Matsushita Electric Industrial Co., Ltd., Osaka, Japan

[21] Appl. No.: 667,480

[22] PCT Filed: Feb. 10, 1984

[86] PCT No.: PCT/JP84/00039
 § 371 Date: Oct. 5, 1984
 § 102(e) Date: Oct. 5, 1984

[87] PCT Pub. No.: WO84/03155
 PCT Pub. Date: Aug. 16, 1984

[51] Int. Cl.[4] .............................................. G02B 6/00
[52] U.S. Cl. ................................. 350/96.34; 350/96.13; 350/96.14
[58] Field of Search ............... 350/96.11, 96.12, 96.13, 350/96.14, 96.34

[56] References Cited

U.S. PATENT DOCUMENTS 4,136,350  1/1979  Tien .................................. 350/96.14

FOREIGN PATENT DOCUMENTS 22120  2/1985  Japan ................................. 350/96.14

OTHER PUBLICATIONS

Kawaguchi et al; "PLZT Thin-Film Waveguides"; Applied Optics; vol. 23, No. 13, pp. 2187-2191; Jul. 1984.
Applied Physics Letters, vol. 31, No. 7, Oct. 1977, pp. 433-434, New York; M. Ishida et al., "Electro-Optic Effects of PLZT Thin Films".

Primary Examiner—William L. Sikes
Assistant Examiner—Robert E. Wise
Attorney, Agent, or Firm—Spencer & Frank

[57] ABSTRACT

An optical switch usable for an optical circuit adapted to be operated by utilizing the electro-optical effect inherent therein. A pair of electrodes are arranged in spaced relation on an optical wave guide which is branched to branch optical wave guides and transmission of light beams is controlled by applying a certain voltage to the electrodes. Both the optical wave guide and the branch optical wave guides are made of electro-optical material. Specifically, the optical wave guides are constituted by a layer of PLZT ((Pb, La) (Zr, Ti) $O_3$) based thin film which is formed by epitaxial growth on a base plate located on the C-plane of sapphire ($\alpha$-alumina). The switch is effective for controlling the transmission of light beams.

18 Claims, 12 Drawing Figures

FIG. 8
(a)
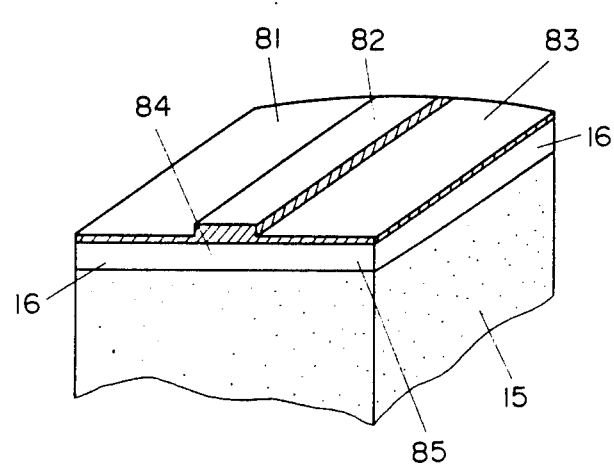
(b)
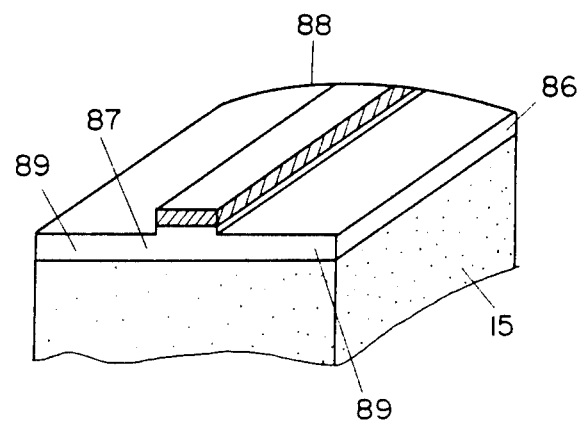

OPTICAL SWITCH

FIELD OF THE INVENTION

The present invention relates to an optical switch usable for optical circuits and more particularly to an optical switch of the type including an optical wave guide, branch optical wave guides and electrodes disposed in spaced relation along the optical wave guide, both the optical wave guide and the branch optical wave guides being made of electro-optical material so that transmission of light beams through the optical wave guides may be switched on or off as required.

DESCRIPTION OF THE PRIOR ART

The Mach-Zehder type optical switch has hitherto been known as a typical optical switch. The conventional optical switch of this type is constituted by a Ti-diffused $LiNbO_3$-based optical wave guide. The Ti-diffused $LiNbO_3$-based optical wave guide is divided into two branch optical wave guides in a Y-shaped configuration and light beams transmitted through the one branch optical wave guide are phase modulated under the influence of the electro-optical effect. Both the branch optical wave guides are united at another Y-shaped branch at which optical interference takes place whereby switching can be carried out.

However, it is found that the conventional Ti-diffused $LiNbO_3$-based optical wave guide has a refractive index which changes by a small amount under the influence of the electro-optical effect. For instance, the amount of change in refractive index was $0.2 \times 10^{-3}$ when the electric field required for a normal switching operation had a rate of 2 KV/mm. Accordingly, to ensure that the switching operation is initiated by a voltage of about 5 V in the presence of phase interference, there is a necessity for designing elements with dimensions larger than 20 mm. For this reason the conventional optical switch cannot be practicably employed when it is to be mounted on an integrated circuit. For instance, when four optical switches are mounted on an integrated circuit, the latter requires a total length of more than 100 mm, inclusive of joint portions between adjacent optical switches where optical wave guides are jointed to one another.

With the foregoing problem in mind, proposals have been made to employ (Pb, La) (Zr, Ti) $O_3$ (hereinafter referred to simply as PLZT) as an optical switch. Obviously, PLZT is a compound oxide material comprising lead oxide, titanium oxide, zirconium oxide and lanthalum oxide. However, a problem was found with respect to PLZT in that grinding of such a ceramic material to a very small dimension in the order of microns and adhesive connection of ground materials were achieved only with great difficulty. This is because of the fact that the body of an optical switch is required to have a thickness in the order of microns when an optical switch is used for an integrated optical circuit utilizing an excellently high electro-optical effect and the transparency of PLZT.

On the other hand, an optical switch has been proposed in which is used transparent PLZT produced by sintering a plurality of oxide materials comprising lead oxide, titanium oxide, zirconium oxide and tantalum oxide on a base plate made of sapphire. Obviously, it is impossible to grind this transparent material to a thickness in the order of microns as will be seen from the foregoing proposal.

Further, it is well known that material can be easily worked to a very thin thickness by employing a conventional deposition method, for instance, the vacuum deposition method. However, since a required composition cannot generally be obtained when a compound oxide material comprising lead oxide, titanium oxide and lanthanum oxide is processed by employing the conventional deposition method, it is believed that such kinds of compound oxide material cannot be worked to provide a thin thickness film for industrial use by means of presently available techniques.

On the other hand, research for obtaining a layer of epitaxial PLZT based thin film by employing the sputtering method have been reported. In this research, a single crystal cubic substrate of MgO and $SrTiO_3$ was used as the substrate material. However, a layer of PLZT based thin film which satisfactorily meets both the requirements of transparency and excellently high electro-optical effect has not been successfully obtained. It is considered that production of a PLZT based thin film of the above-mentioned type cannot be achieved as long as the presently available techniques alone are utilized.

Furthermore, the Ti-diffused $LiNbO_3$-based optical wave guide suffers from a problem in that the light-transmission loss is increased and the extinction ratio is decreased due to a large amount of mode conversion, unless a single mode consisting of a graded index structure (a structure in which the refractive index is changed in a substantially quadratic manner in the region around the guide) is used. This structure, however, makes it difficult to couple the transmitted light to another optical element and to design an element with very small dimensions. Moreover, it has the drawback that diodes made of semi-conductor materials in the III to V groups for the purpose of detecting transmission of light beams cannot be employed for an integrated circuit. Another drawback is found in that upon producing very small optical components such as microlenses, prisms or the like, heat treatment at an elevated temperature of 1,100° C. causes the boundary of a light beam transmission passage to expand due to the occurrence of dispersion and therefore it is difficult to design them with very small dimensions. Accordingly, they cannot be practicably used as optical devices such as base plates for optical integrated circuits.

The inventors have discovered that when a layer of compound oxide material as mentioned above is produced by employing the ion beam deposition method, such as the high frequency sputtering method, a thin film structure having good transparency and excellently strong electro-optical effect can unexpectedly be obtained at high reproduceability by properly selecting the composition of the target for the sputtering process.

The inventors have been able to resolve the foregoing problems inherent to conventional optical switches by using optical wave guides constituted by the above-mentioned PLZT based thin film for producing an optical switch.

SUMMARY OF THE INVENTION

The present invention has been made on the basis of the inventors' dicoveries as mentioned above and its object resides in providing an optical switch constituted by a layer of PLZT based thin film including compound oxide material comprising lead oxide, titanium oxide and lanthanum oxide, the PLZT based thin film structure having good transparency and excellently strong electro-optical properties, which can be made integral with an element for detecting transmission of light beams and is easily designed with very small dimensions and incorporated into an integrated circuit.

To accomplish the above object there is proposed according to the present invention an improved optical switch of the type including at least an input optical wave guide, two branch optical wave guides, a pair of transmission control electrodes and a branch portion at which the input optical wave guide is branched to the branch optical wave guides the input optical wave guide and the branch optical wave guides being made of electro-optical material and the transmission control electrodes being arranged in spaced relation with a gap having a predetermined width therebetween at a position located on the input optical wave guide or one of the branch optical wave guides, so that transmission of light beams through the input optical wave guide and the branch optical wave guides is controlled by applying a certain voltage to the transmission control electrodes and thereby changing the refractive index of the optical wave guide at the position located below the gap, wherein the improvement consists in that the input optical wave guide and the branch optical wave guides are constituted by a layer of PLZT ((Pb, La) (Zr, Ti) $O_3$) based thin film which is formed by epitaxial growth on the base plate located on C-plane of sapphire ($\alpha$-alumina).

According to the present invention, the PLZT based thin film constituting the input optical wave guide and the branch optical wave guides has a mol ratio of Pb/Ti determined to be in the range of $0.65 < Pb/Ti < 0.90$ so that it has good transparency and an excellently strong electro-optical effect. Thus, it is possible to operate the optical switch by application of a lower voltage when switching is to be initiated.

In an embodiment of the invention, the surface of the PLZT based thin layer is constituted with (111)-plane of sapphire so that an excellently strong electro-optical effect is assured for the optical switch.

BRIEF DESCRIPTION OF THE DRAWINGS

FIGS. 8($a$) and 8($b$) are fragmental perspective views similar to FIG. 7, illustrating an essential part of the optical switch modified from the foregoing embodiments on an enlarged scale.

DESCRIPTION OF THE PREFERRED EMBODIMENTS

The present invention will now be described in greater detail hereunder with reference to the accompanying drawings which schematically illustrate the preferred embodiments thereof.

The present invention consists of an optical switch in which an optical wave guide made of Ti-diffused $LiNbO_3$ is not employed but an optical wave guide made of (Pb, La) (Zr, Ti) $O_3$ based thin film (hereinafter referred to as PLZT based thin film) is employed, the last-mentioned optical wave guide being transparent and having an excellent electro-optical effect.

Figure 1:
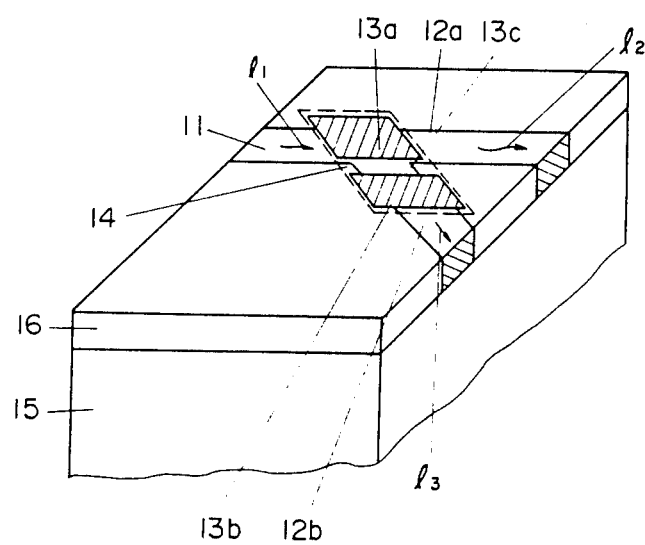
FIG. 1 is a schematic perspective view of an optical switch in accordance with the first embodiment of the invention.
Figure 2:
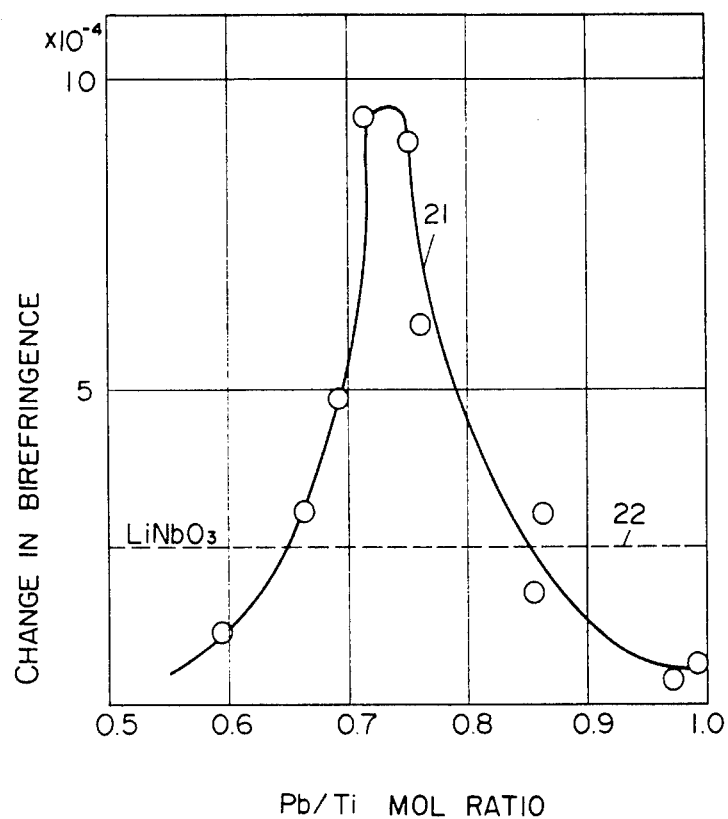
FIG. 2 illustrates how the complex refractive index varies under the working condition of a voltage of 2 KV/mm applied to the optical switch as the mol ratio of Pb/Ti relative to the composition of the thin film layer varies, wherein the variation in the complex refractive index of $LiNbO_3$ is shown by a dotted line for the purpose of comparison.

First, description will be made as to an optical switch in accordance with the first embodiment of the invention as schematically illustrated in FIG. 1. The optical switch of the invention as illustrated in the drawing is constructed such that it includes at least an input optical wave guide 11, two branch optical wave guides 12$a$, 12$b$, a pair of transmission control electrodes 13$a$, 13$b$ and a branch portion 14 at which point inputted light beam $l_1$ is divided into the branch optical wave guides 12$a$ and 12$b$ via the input optical wave guide 11, both the input optical wave guide 11 and the branch optical wave guides 12$a$ and 12$b$ being made of electro-optical material and the pair of transmission control electrodes 13$a$ and 13$b$ being located opposite to one another with a gap 13$c$ having a predetermined width therebetween located on the input optical wave guide 11 through which inputted light beam $l_1$ is transmitted or on the branch optical wave guides 12$a$ and 12$b$ through which branched light beams $l_2$ and $l_3$ are transmitted, so that the refractive index of the optical wave guide located beneath the gap 13$c$ is varied by applying a certain voltage between the transmission control electrodes 13$a$ and 13$b$ so as to control the intensity of light beams transmitted through the input optical wave guide 11 and the branch optical wave guides 12$a$ and 12$b$, wherein the input optical wave guide 11 and the branch optical wave guides 12$a$ and 12$b$ are constituted by PLZT based thin film 16 which is prepared by epitaxial growth of sapphire ($\alpha$-alumina) on its C-plane which constitutes a substrate 15. Particularly, the PLZT based thin film 16 is made of lead oxide, titanium oxide and lanthanum and the mol ratio of Pb/Ti in the thin film structure is determined to be in the range of $0.65 < Pb/Ti < 0.90$. FIG. 2 illustrates measured values representing the electro-optical effect of the thin film, wherein the measured values obtained as the Pb/Ti ratio is changed are plotted on a characteristic curve. Specifically, the curve 21 in FIG. 2 shows how the electro-optical effect of the thin film structure made of lead oxide, titanium oxide and lanthanum oxide varies in dependence on variations in its composition (that is, in dependence on changes in Pb/Ti ratio). For the purpose of comparison, a linear line 22 is shown in the drawing which represents the properties of LiNbO3 single crystal, which is widely used as a material for optical integrated circuits these days. It will be readily apparent from the drawing that a PLZT based thin film has an electro-optical effect stronger than that of LiNbO3 single crystal while the Pb/Ti ratio is determined to be in the range of 0.65<Pb/Ti<0.90 and therefore it is practical to employ. However, in the case of Pb/Ti≦0.65 or Pb/Ti≧0.90 it can be seen that a PLZT based thin film has the same electro-optical effect as that of LiNbO3 or an electro-optical effect weaker than that of the latter. This means that the PLZT based thin film has no practicability in these ranges. It should be noted here that no excellent electro-optical effect can be expected with respect to conventional ceramics materials in the range of 0.65<Pb/Ti<0.90 and measurement data are not available. With the foregoing background in mind the inventors conducted research and development in order to obtain an optical switch in the form of a thin film structure in the above-mentioned composition range. As a result they discovered an area where an excellently strong electro-optical effect could be obtained, as illustrated in FIG. 2, which was not expected with conventional ceramics materials. Thus, they have invented an optical switch employing a lower operating voltage on the basis of the above-mentioned discovery. Further, they conducted a number of elaborate experiments with respect to the material of the base plate and the crystal structure of this kind of PLZT based thin film. As a result they confirmed the optimum base plate material and crystal orientation for PLZT based thin film structure. As typical growth planes of the thin film structure (111)-plane, (110)-plane and (100)-plane are to be noted. Previously it has usually been considered that the (111)-plane has not necessarily the highest value in terms of electro-optical effect but the inventors confirmed that this (111)-plane exhibited a high electro-optical effect such as is illustrated in FIG. 2. Further, they discovered that the (111)-plane on the thin film structure was easy to grow in spite of the fact that it lacked excellent lattice compatibility with the C-plane of sapphire, and they also confirmed that the C-plane of sapphire was the optimum plane for the base plate usable for the optical switch of the invention.

Next, the present invention will be described below with respect to concrete examples.

Pulverized lead oxide, titanium oxide and lanthanum oxide were weighed such that their mol ratio became 0.72:0.28:0.93 and they were then mixed well. After the mixture was calcined, a part of the burnt mixture was placed on a dish to serve as a target for sputter vaporization. On the other hand, a C-plane of sapphire was employed for the base plate 15 and the temperature of the base plate 15 was selectively determined at 580° C. and a distance of 3.5 cm was maintained between the base plate and the target. Further, the mixing ratio of a gas mixture comprising argon and oxygen was determined at 3:2 and gas pressure was reduced to $5 \times 10^{-2}$ Torr. After sputtering had been effected for one hour by operating a magnetron sputtering apparatus, a thin film 16 having a thickness of about 400 microns was obtained.

Figure 3:
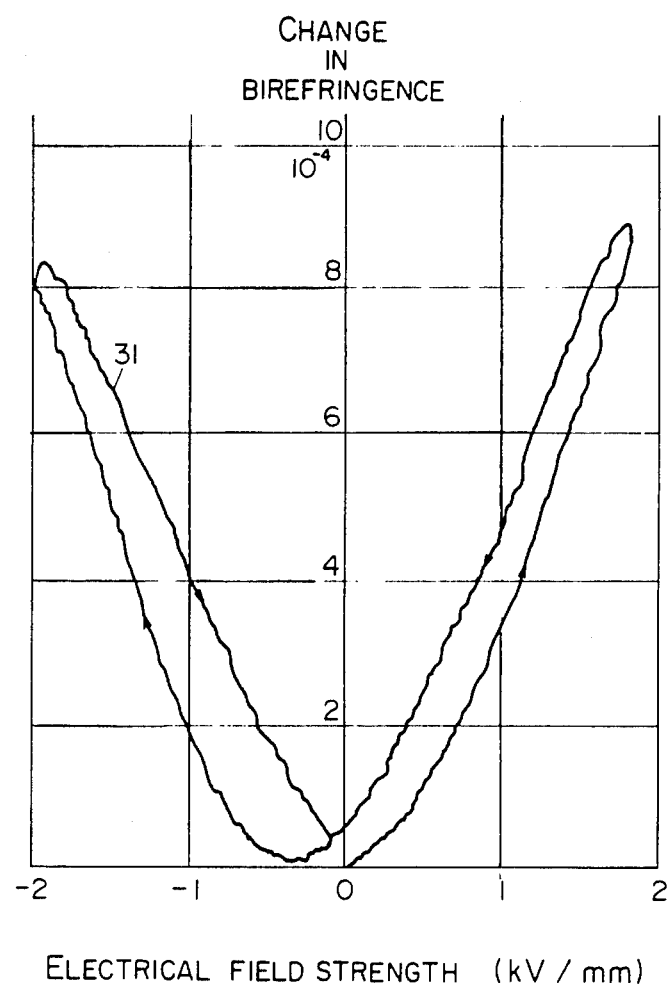
FIG. 3 illustrates how the complex refractive index of the thin film structure made of high dielectric material varies as the intensity of the electric field varies.

Crystalization of the thin film structure was examined by X-ray diffraction and electron beam diffraction. As a result it was confirmed that the (111)-plane was a grown single crystal thin film. The composition of the thin film 16 was examined by operating an X-ray microanalyzer and the result was Pb/Ti=0.75. The electro-optical effect of the thin film structure was evaluated by measuring the change in birefringence with a certain voltage being applied thereto. When voltage was applied at a rate of 2 KV/mm, the change in birefringence amounted to $9 \times 10^{-4}$ which was a value about four times as high as that of LiNbO3. FIG. 3 illustrates the relationship between voltage and the birefringence change found as a result of measurements of the electro-optical effect as mentioned above. Specifically, curve 31 in the drawing shows how birefringence change varies as the applied voltage varies. It will be readily apparent from the drawing that it varies in the so-called squared fashion relative to applied voltage.

As described above, the inventors have invented an optical switch which utilizes an excellently high electro-optical effect in an area which was not to be expected with the conventional optical switch made of ceramics material or thin film. Further, they confirmed that epitaxial growth takes place on the (111)-plane of the thin film structure of a semiconductor such as Si, GaAs or the like by employing, for instance, the gas phase growing method, particularly on the (0001)-plane. Since a thin film made of semiconductor as mentioned above can be modified to the p - n structure or p - i - n structure in accordance with the conventional semi-conductor processing method to produce an optical detecting element, it is possible to integrate a modulating element with an optical detecting element.

Figure 4:
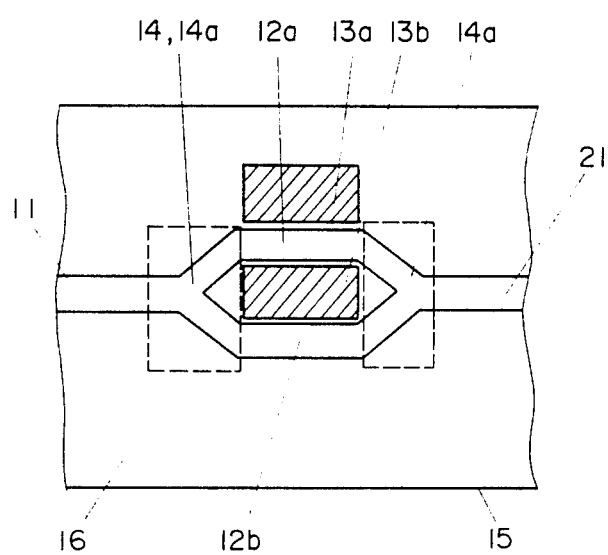
FIG. 4 is a schematic plan view of an optical switch in accordance with the second embodiment of the invention.

Further, the inventors examined the above-mentioned structures elaborately. As a result they discovered another useful structure and they have invented another useful optical switch on the basis of their discovery. Referring to FIG. 4, the same parts or portions as those constituting the optical switch in FIG. 1 are identified by the same reference numerals. The optical switch as illustrated in FIG. 4 is constructed such that the branch portion 14 is designed in a Y-shaped branch 14a at which an inputted light beam transmitted through the input optical wave guide 11 is equally distributed into two parallel extending branch optical wave guides 12a and 12b which are united at another Y-shaped branch 14a to be connected to the output optical wave guide 21, at least the one branch optical wave guide 12a being located between the pair of transmission control electrodes 13a and 13b which serve to reduce the refractive index of the branch optical wave guide 12a with a certain voltage being applied to the transmission control electrodes 13a and 13b so that phase interference takes place with light beams transmitted through the branch optical wave guides 12a and 12b to control transmission of light beams to the output optical wave guide 21. As is apparent from FIG. 5, PLZT based thin film 16 is preferably formed with a ridge portion 51 raised from the upper surface thereof so that the input and output optical wave guides 11, 21 and the branch optical wave guides 12a, 12b are built by the ridge portion 51.

Further, the inventors discovered that the optical wave guide structure including the PLZT based thin film with the ridge portion formed thereon in that way was different from the conventional optical switch which had a graded index structure in a single mode and that it could be practicably used as an optical modulating element because of less occurrence of mode conversion and less loss during transmission of light beams. Thus, they succeeded in realizing the optical switch of the invention on the basis of their discovery as mentioned above.

Figure 5:
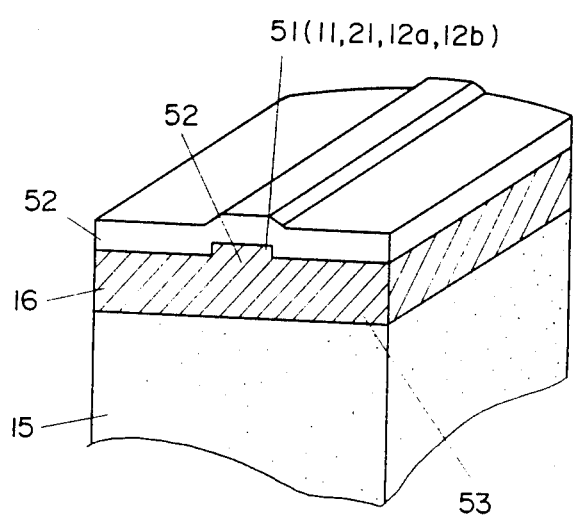
FIG. 5 is a fragmental perspective view of an essential part of the optical switch in accordance with the second embodiment, shown on an enlarged scale.

Specifically, as illustrated in FIGS. 4 and 5, the optical switch of the invention comprises PLZT based thin film which can be normally used as an optical wave guide and of which the film thickness is in the range of 0.1 to 2 microns and therefore it is different from the conventional optical switch which includes a Ti-diffused $LiNbO_3$ based optical wave guide in the graded index structure. They discovered that when a multimode optical wave guide was built in such a structure, the width of the optical wave guide was determined in the range of 3 to 30 microns and the film thickness, that is, the step height as measured between the ridge 51 and the upper surface of the thin film, was determined at less than one-fourth of the film thickness of PLZT based thin film as measured at the ridge portion 51, mode conversion took place without any problem and loss of light beams during transmission could be reduced to less than 20 dB/cm (in case of light beams having a wave length of 1.06 micron) so that it could be satisfactorily put in practical use as an element. Thus, they succeeded in realizing the optical switch of the invention on the base of their discovery as mentioned above. Further, they confirmed that light beam modulation was achieved in the optical switch of the invention at a rate higher than 90% without any particular problem from the viewpoint of practicability and moreover the optical switch of the invention was easily coupled to other optical components owing to the arrangement made in the multi-mode. It should be noted that when the step height is determined to be more than one-fourth of the film thickness of the PLZT based thin film as measured at the ridge portion, or when the width of the optical wave guide is determined to be less than 3 microns, loss of light beam during transmission exceeds 20 dB/cm (corresponding to a wavelength of 1.06 $\mu$m) and when the width of the optical wave guide is determined to be more than 30 microns, an element is designed in larger dimensions and a gap between the pair of transmission control electrodes increases, resulting in the fact that a higher operating voltage is required. Accordingly, designing of an optical switch effected in such a way has no practicability.

Further, the inventors discovered that the optical switch of the invention as constructed in the above-described manner was easily fitted with microlens designed in very small dimensions due to no occurrence of transverse expansion of the optical wave guide under the influence of thermal diffusion.

Since the optical switch as illustrated in FIG. 4 tends to suffer from increased loss of light beam during transmission because the pair of transmission control electrodes 13a and 13b are located very close to the optical wave guide, the former are preferably spaced away from the latter with a buffer layer 52 being arranged therebetween as illustrated in FIG. 5. However, it has hitherto been believed that PLZT based material has an electro-optical effect higher than that of $LiNbO_3$, which is most popularly used at present, but has a high dielectric constant and therefore, since the buffer layer is usually constructed of a material having a lower dielectric constant, the electric field fails to be satisfactorily introduced to the optical wave guide and thereby higher voltage must be applied to the pair of transmission control electrodes to achieve sufficient modulation. It has been believed that, for instance, when a PLZT based thin film having a dielectric constant of 2000 and a film thickness of 0.35 micron is covered with a layer of tantalum oxide having a dielectric constant of 20 and a film thickness of 0.2 micron and a pair of phase control electrodes with a gap having a width in the range of 5 to 20 microns disposed therebetween are provided, the voltage applied to the optical wave guide was only at a rate of 10 to 50%. Unexpectedly, the inventors confirmed that voltage was actually applied to the modulating element of the invention at a rate in the range of 50 to 80% and therefore it could be put into practical use without any problem.

Description will be made below as to a concrete example of the optical switch of the invention.

As illustrated in FIG. 5, a C-plane (0001) of sapphire ($\alpha$-alumina), the surface of which had been ground, was used as a base plate 15 and a PLZT based thin film 16 having a thickness of 0.4 micron was formed on C-plane of sapphire constituting the base plate 15 in accordance with the radio frequency magnetron sputtering process. In this example the composition of the target used for the thin film structure was PLZT (28/0/100), the base plate made of sapphire was kept at a temperature of 580° C. during sputtering operation and an electric power of 200 W was consumed when carrying out the sputtering process. The PLZT based thin film 16 thus produced had a structure whose (111)-plane was constituted by single crystal and whose refractive index was 2.6 as measured by using a He-Ne laser (having a wave length of 0.6328 micron). Next, the surface of the PLZT based thin film was coated with photo-resist over the light beam transmission passage having a width of 20 microns and a configuration as illustrated in FIG. 4 and it was then subjected to etching to a depth, for instance, of 0.065 nm by using an ion beam whereby the ridge portion 51 was formed. Since an effective refractive index generally usable for analyzing light beam transmission passage is found higher in the high thickness film area 52 including the ridge portion 51 than the low thickness film area 53, it follows that light beams are confined to the upper film area 52. This means that the upper film area 52 can be used as an optical wave guide. Next, a layer of $Ta_2O_5$ film was formed on the thin film structure in the area as defined between the transmission control electrodes and the optical wave guide as a buffer layer in accordance with the magnetron sputtering method. The layer of $Ta_2O_5$ film thus produced was non-crystalline and its refractive index was 2.1 as measured by using He-Ne laser (having a wave length of 0.6328 micron). Next, the transmission control electrodes 13a and 13b were formed of vaporized aluminum. Thus, an optical switch as illustrated in FIG. 4 was obtained.

Figure 6:
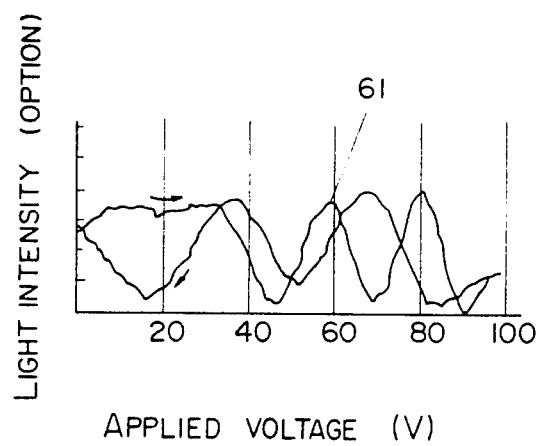
FIG. 6 illustrates how light beam intensity varies as the voltage applied to the optical switch in accordance with the second embodiment varies.

After the optical switch as constructed in the above-described manner was produced, its modulation of light beam intensity was measured while only one of the optical wave guides, for instance, the branch optical wave guide 12a, was applied with a certain voltage. The results of these measurements are shown in FIG. 6. In the drawing a curve 61 represents how light beam intensity varies as voltage varies. As is apparent from the drawing, the voltage at a half wave length for light beam intensity was 10 V when a bias voltage of 60 V was applied. This value is about half that of the conventional optical switch including Ti-diffused $LiNbO_3$ based optical wave guides designed to the same dimensions. This means that the optical switch of the invention has excellent properties compared with those of the conventional LiNbO3 based optical switch and it can be designed in dimensions smaller than half those of the conventional optical switch.

Figure 7:
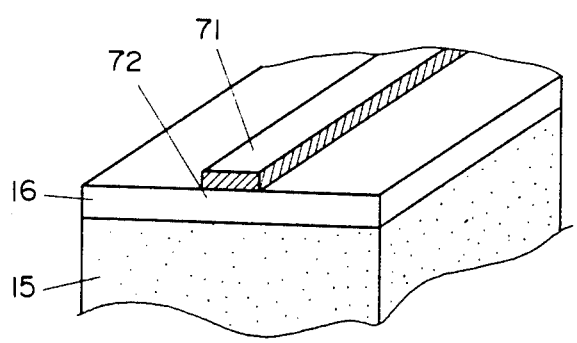
FIG. 7 is a fragmental perspective view of an essential part of the optical switch modified from the embodiment in FIG. 6, shown on an enlarged scale.

Further, the inventors conducted a variety of elaborate experiments with respect to the construction of the optical switch of the invention produced in that way. As a result, they discovered another optical wave guide having the same electro-optical effect as that of optical wave guides of a PLZT based thin film structure. Thus, they invented another useful optical switch on the basis of the above mentioned discovery. It was confirmed that the structure illustrated in FIG. 7 assured the same electro-optical effect as that of the foregoing one. It should be noted that in the drawing the same components as those in FIG. 1 are identified by the same reference numerals. Referring to FIG. 7 again, the surface of the PLZT based thin film 16 is fitted with a load layer 71 made of dielectric material. To ensure that light beams are transmitted only through the load type optical wave guide 72 comprising PLZT based thin film 16 located below the load layer 71, the light refractive index of the insulative base plate 15 and the insulative load layer 71 is determined to be smaller than that of the PLZT based thin film 16. Further, the inventors have discovered the optimum material for the above described structure and fabricated an optical switch having excellent properties on the basis of their discovery. Specifically, they discovered that the optimum structural material which could satisfactorily resolve the problem of crystal compatibility as between the base plate 15 made of sapphire, the PLZT thin film layer 16 and the load layer 71, as well as the problem relative to refractive index, was concerned with the load layer and the insulative base layer. Thus, they found that an optical switch having excellent properties could be obtained on the basis of their above mentioned discovery. The inventors discovered that the load layer 71 should be preferably constructed of at least one selected from a group of oxides such as titanium oxide, tantalum oxide, niobium oxide, zirconium oxide, aluminum oxide or the like and a group of nitrides such as silicon nitride or the like. Further, they discovered that when the above-noted material was processed by employing, for instance, the RF-two electrodes type sputtering method, the magnetron sputtering method, the ion beam sputtering method or the like, crystal in the granular form was not unexpectedly produced on a PLZT based single crystal thin film structure with the use of noncrystalline material and a layer of thin film oriented in the C-axis was formed when using crystalline material such as zinc oxide or the like. Further, they discovered that tantalum oxide was especially suitable for use as the load layer. Namely, it was found that a layer of load layer having excellent properties could be produced by using tantalum oxide, for instance, in accordance with the magnetron sputtering method.

More particularly, a layer of tantalum oxide thin film having a thickness of about 0.2 micron was vacuum deposited on PLZT thin film layer 16 by employing the magnetron sputtering method. When vacuum deposition was carried out with the substrate being kept at a temperature lower than 150° C. during depositing operation, a layer of transparent non-crystalline tantalum oxide thin film was formed. Next, the tantalum oxide thin film structure thus formed was subjected to etching in accordance with the photo-lithographic method which has been conventionally employed in the field of semiconductor processing to form a pattern predetermined for an optical wave guide. As a result, an optical wave guide employable for the optical switch of the invention was obtained. Further, by additionally arranging a pair of transmission control electrodes, the required optical switch was produced.

It was confirmed that besides tantalum oxide other oxide materials such as titanium oxide, niobium oxide, zirconium oxide, aluminum oxide or the like and other nitride materials such as silicon nitride or the like could be used in accordance with the same processing method as that for tantalum oxide so as to vacuum deposit a load layer in the form of a non-crystalline film on PLZT based thin film and therefore they were advantageously employable as materials constituting the optical switch of the invention. Further, it was confirmed that when zinc oxide or the like oxide material was processed on a PLZT based thin film by employing, for instance, the RF sputtering method, a layer of transparent film oriented in the C-axis was formed and thereby an optical switch was produced by way of the same steps as those for processing tantalum oxide.

In the foregoing example, description has been made as to the case where the load layer 71 is formed in the band-shaped configuration on the a PLZT based thin film structure. However, it should not be limited only to a band-shaped configuration on a PLZT based thin film structure 16. Alternatively, the load layer 71 may be formed in any other configuration, as long as the effective refractive index of the PLZT based thin film layer 16 is so increased that light beams are confined within the PLZT based thin film layer 16. For instance, a structure as illustrated in FIGS. 8(a) and 8(b) is employable. Referring first to FIG. 8(a), a PLZT based thin film layer 16 is formed on the sapphire C-plane substrate and a load layer 81 is then deposited on the PLZT based thin film layer 16 with a thickness different from that of the latter. When the load layer 81 is constituted, for instance, by tantalum oxide the thickness of which is determined to be 0.2 micron in the thicker area 82 and 0.005 micron in the thinner area 83, the effective refractive index of the PLZT based thin film layer becomes higher in the area 84 located below the thickner area 82 of the tantalum oxide layer than that in the area 85 located below the thinner area 83 of the same. Thus, light beams are transmitted through the PLZT based thin film structure while transmission of the light beams is confined within the area 84 located below the thicker area of tantalum oxide layer. On the other hand, in cases such as that illustrated in FIG. 8(b), a PLZT based thin film 86 having the stepped cross-sectional configuration is formed on the sapphire C-plane substrate 15 and a load layer 88 is then deposited on the PLZT based thin film structure 86 in the area 87 located above the thicker area of the latter. When the load layer 88 made of tantalum oxide having a thickness of 0.2 micron is deposited on the thicker area 87 having a thickness of 0.5 micron of the PLZT based thin film structure 86 the thinner area of which has a thickness of 0.49 micron, the effective refractive index in the thicker area 87 becomes higher than that in the thinner area 89 whereby light beams are transmitted through the PLZT based thin film structure while transmission of light beams is confined within the thicker area 87. Thus, the required optical switch is obtainable.

Figure 9:
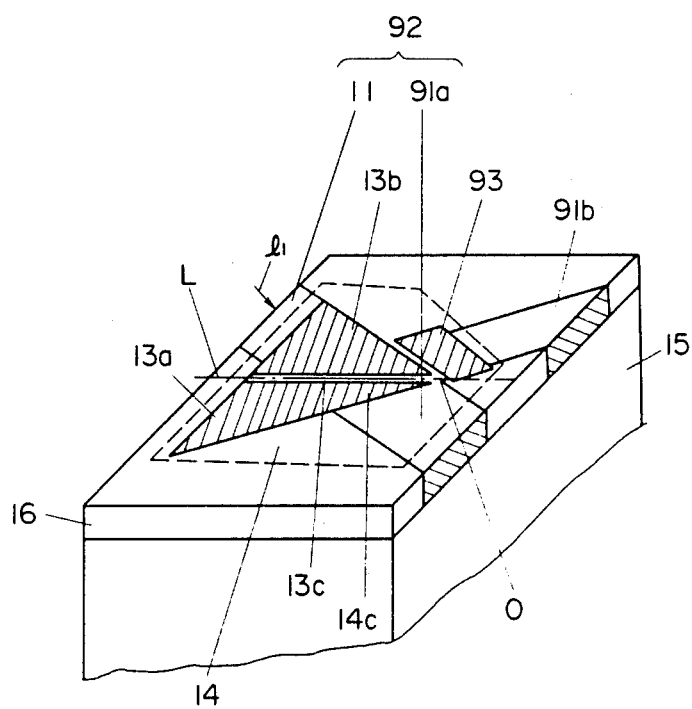
FIG. 9 is a schematic perspective view of an optical switch in accordance with another modified embodiment of the invention.

Next, FIG. 9 is a schematic perspective view of an optical switch to which the embodiment of the invention as illustrated in FIG. 1 is applied. The same components constituting the optical switch as those in FIG. 1 are identified by the same reference numerals. As is apparent from the drawing, a main optical wave guide 92 includes a first branch optical wave guide 91a which is constituted by an extension from the input optical wave guide 11 and a second branch optical wave guide 91b is jointed to the branch portion 14 at which the input optical wave guide 11 constituting the main optical wave guide 92 is jointed to the first branch optical wave guide 91a so that a second Y-shaped branch 14c is formed while a pair of transmission control electrodes 13a and 13b are arranged on the second Y-shaped branch 14c. Specifically, the transmission control electrodes 13a and 13b are arranged in spaced relation with a certain gap therebetween in such a manner that a linear line L extending across the main optical wave guide 92 at a certain inclination angle relative to the latter is located between both the transmission control electrodes 13a and 3b, wherein the aforesaid inclination angle is so determined that light beam $l_1$ transmitted through the main optical wave guide 92 is totally reflected at the area extending from an apex 0 through the gap between both the transmission control electrodes 13a and 13b, the apex 0 being located at the top of a triangle built by the main optical wave guide 92 and the second branch optical wave guide 91b, whereby reflected light beams are introduced into the second branch optical wave guide 91b. Further, the one transmission control electrode 13b and the light beam leakage control electrode 93 are arranged also in spaced relation with a certain gap being located at the boundary area as defined by the main optical wave guide 92 and the second branch optical wave guide 91b. In the illustrated embodiment the one transmission control electrode 13b is used to function as one of the pair of leakage control electrodes for the purpose of saving the space occupied by the optical switch of the invention. Referring to FIG. 9 again, reference numeral 15 designates a substrate located on a C-plane of sapphire. A layer of single crystal located on the (111)-plane of PLZT which is a material having an excellent electro-optical effect is deposited on the surface of the substrate 15 to a thickness of 0.5 micron in accordance with the sputtering deposition method. After completion of deposition two optical wave guides 92 and 91b are formed to a width in the range of 4 to 50 microns by employing the photo-lithographic technique. Reference numerals 13a, 13b and 93 each designate an electrode formed on the optical wave guides 91b and 92. In the illustrated embodiment the gap between each pair of adjacent electrodes 13a, 13b and 93 is determined to be in the range of 2 to 6 microns. When the electrodes 13a and 13b are charged to the same potential and a certain voltage is applied to the electrodes 13b and 93, a layer having reduced refractive index is produced at the area located below the gap extending between the electrodes 13b and 93 whereby a light beam transmitted through the main optical wave guide 92 is totally reflected at the layer having a reduced refractive index and it is then further linearly transmitted through the main optical wave guide 92 without any occurrence of leakage to the second optical wave guide 91b. Next, both the electrodes 13a and 13b are loaded with the same voltage which is predetermined such as to meet the requirements for total reflection and both the electrodes 13b and 93 are charged to the same potential. This causes a layer having a reduced refractive index to be formed at the area located below the gap extending between the electrodes 13a and 13b and thereby a light beam transmitted through the main optical wave guide 92 is totally reflected at the layer having a reduced refractive index so that reflected light beams are introduced into the second branch optical wave guide 91b. Thus, by making the necessary combination as between the electrodes 13a, 13b and 93 and selectively applying voltage to them in that way it is assured that light beam inputted into the main optical wave guide 92 can be further linearly transmitted through the main optical wave guide 92 or can be introduced into the second branch optical wave guide 91b after reflection at the layer having a reduced refractive index while an excellent light beam extinction ratio is maintained.

It should be noted that both in the case of light beams being linearly transmitted and when they are totally reflected while a voltage of 50 V is applied to preselected electrodes, the optical switch in accordance with this embodiment has an excellent light beam extinction ratio of higher than 20 dB.

Figure 10:
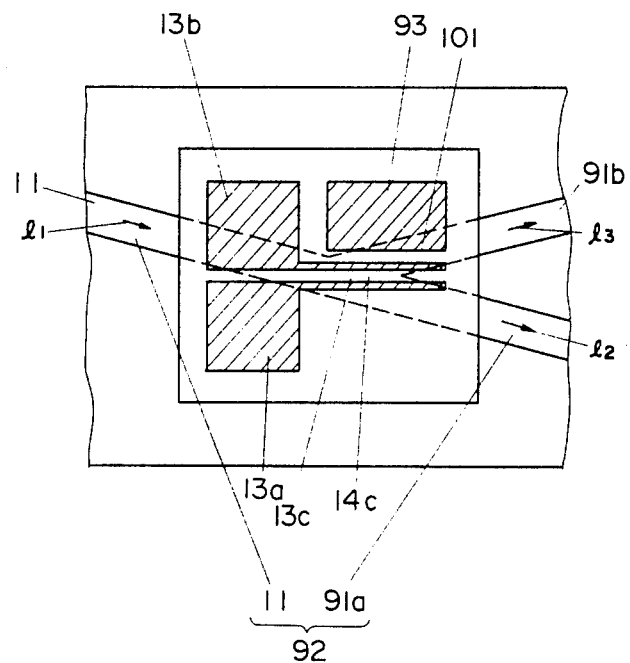
FIG. 10 is a schematic plan view of an optical switch in accordance with another modified embodiment of the invention.

Next, FIG. 10 is a plan view of an optical switch modified from that illustrated in FIG. 9.

An optical switch in accordance with this embodiment of the invention essentially comprises a main optical wave guide 92, a second branch optical wave guide 91b jointed to the main optical wave guide 92, a pair of transmission control electrodes 13a and 13b arranged in spaced relation with a gap 13c having a constant width located therebetween, the gap 13c extending along the bisector of a triangle formed by both the optical wave guides 91b and 92, the apex of the triangle being located at the position of a second Y-shaped branch 14c, and a leakage control electrode 93 adapted to control leakage of light beams transmitted through the main optical wave guide 92 to the second branch optical wave guide 91b via the second Y-shaped branch 14c, the leakage control electrode 93 being arranged in spaced relation from the transmission control electrode 13b with a second gap 101 having a constant width located therebetween, the second gap 101 extending in parallel with the gap 13c and across the second branch optical wave guide 91b at a position in the proximity of the second Y-shaped branch 14c.

It has hitherto been believed that in the conventional optical switch of the above-mentioned type including a second gap 101 which extends in parallel with the gap 13c, light beams leaked to the second branch optical wave guide 91b via the main optical wave guide 92 is totally reflected at the layer having reduced refractive index located below the second gap 101 owing to the electro-optical effect obtainable when the second gap 101 is influenced by the electrical field but leaked light beams fail to be fully returned to the main optical wave guide 92 because of the geometrical arrangement of the conventional optical switch. Thus, it has been considered that the conventional optical switch has an insufficiently improved light beam branch ratio. However, the inventors discovered that light beam $l_1$ inputted into the main optical wave guide 92 was transmitted further without any occurrence of leakage of light beams to the second branch optical wave guide 91b in the optical switch of the above-mentioned type by making such an arrangement that the gap 13c was not affected by the electrical field, only the second gap 101 being so affected. Thus, they invented another new optical switch on the basis of their discovery as mentioned above. Although the principle underlying the operation of the optical switch has not been clarified, it is believed that there is a decrease in the amount of leaked inputted light beam $l_1$ due to the existence of a layer having reduced refractive index formed at the area located below the second gap 101 whereby light beams are transmitted further without any occurrence of leakage to the auxiliary passage and at the same time transmission of light beams is confined within the main light beam transmission passage having a high refractive index.

As a result of elaborate research on the optical switch of the invention it has been found that the optimum width of optical wave guide is in the range of 4 to 20 microns. When it has a width of less than 4 microns, the gap between adjacent electrodes measures between 2 and 4 microns but it is impossible to realize the affect of the optical switch of the invention. On the other hand, when it has a width of more than 20 microns, it is also impossible to realize the effect of the optical switch of the invention even when the optical switch is constructed with the same structure as in the foregoing embodiment. The optical switch of the invention can be obtained, for instance, by forming optical wave guides with the same structure as in the foregoing embodiment and then forming a pair of transmission control electrodes 13a and 13b and a leakage control electrode 93 at the second Y-shaped branch 14c by employing the aluminum vacuum deposition method and the photo-lithographic technique, each of the electrodes 13a, 13b and 93 having a film thickness of 0.1 micron and a gap width of 4 microns. Further, by preparing a layer having a reduced refractive index at the position located below the gap 13c on the main optical wave guide 92 while the electrodes 13a, 13b and 93 are charged to the same potential and a certain voltage is applied to both the electrodes 13b and 93 so as to produce an electrical field at, for instance, a rate of 10 V/micron, it is found that light beam $l_1$ inputted into the main optical wave guide 92 is linearly transmitted through the latter with no occurrence of leakage to the second branch optical wave guide 91b. In this case a light beam branch ratio of more than 20 dB is obtainable. On the other hand, when the optical switch is operated under such a condition that the electrodes 13b and 93 are charged to the same potential and a certain voltage is applied to both the electrodes 13a and 13b so as to produce an electrical field at a rate of 10 V/micron, inputted light beam $l_1$ is fully refracted at the layer having a reduced refractive index located below the gap 13c on the main optical wave guide 92 and reflected light beam $l_3$ is introduced into the second branch optical wave guide 91b. In this case a light beam branch ratio of more than 20 dB is obtainable with the optical switch of the invention.

Figure 11:
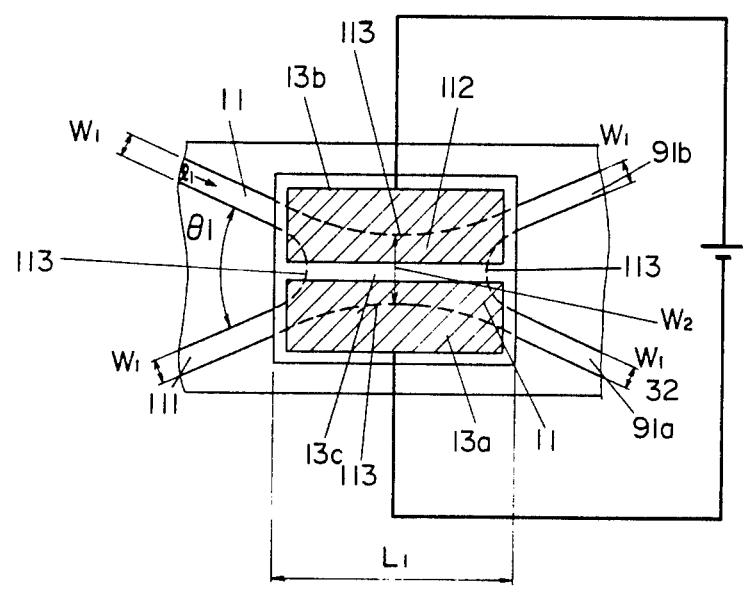
FIG. 11 is a schematic plan view of an optical switch in accordance with a further modified embodiment of the invention.

Next, FIG. 11 is a plan view of an optical switch modified from that illustrated in FIG. 8. The same or similar components to those in FIGS. 1 and 9 are identified by the same reference numerals. The optical switch in accordance with this embodiment is constructed such that it includes a second input optical wave guide 111 located on an extension line from the second branch optical wave guide 91b and a third Y-shaped branch 112 disposed at the branch portion and the width $W_1$ of the first and second input optical wave guide 11 and 111 and the first and second branch optical wave guide 91a and 91b is dimensioned so as to gradually increase toward the central part of the third Y-shaped branch 112, wherein the outer peripheral line 113 of the first and second input optical wave guides 11 and 111 and the first and second branch optical wave guides 91a and 91b is designed with a hyperbolic configuration.

It has hitherto been believed that the conventional optical switch of the above-mentioned type has not made the inhibition of natural expansion of transmitted light beams in the transverse direction and thus a sufficiently high light beam branch ratio is not obtained. Further, it is believed that since the outer peripheral line of the first input optical wave guide 11 through which inputted light beam $l_1$ is transmitted is jointed to that in the third Y-shaped branch not in the hyperbolic configuration due to the relation between film thickness and width of the optical wave guide, a required transmission mode is not maintained and moreover a higher mode which is liable to deteriorate the light beam branch ratio tends often to occur. However, the inventors discovered that in the optical switch of the invention, inputted light beam $l_1$ was directly introduced into the optical wave guide 12a without any fear of causing leakage of light beams to the optical wave guide 12b when passing through the branch portion. As a result they succeeded in realizing another new optical switch as disclosed in this embodiment.

Moreover, they conducted a variety of careful experiments with respect to the structure of the optical switch as so constructed and thereafter found that the optimum width of any optical wave guide was in the range of 5 to 30 microns. When an optical wave guide has a width narrower than 5 microns, transmitted light beams are naturally caused to expand widely in the optical wave guide, resulting in the fact that an excellently high light beam branch ratio cannot be obtained. On the other hand, when it has a width wider than 30 microns, the branch portion is designed in larger dimensions and therefore the whole optical switch is constructed to a smaller size only with great difficulty. This means that the optical switch of the invention so dimensioned is not suitably employable for an integrated circuit. Further, it was found that the optimum intersection angle at the branch portion of optical wave guides was in the range of 1 to 5 degrees. It is considered that when an intersection angle is smaller than 1 degree, leakage of transmitted light beams tends to occur due to natural expansion of the light beams in the optical wave guide. On the other hand, when it is larger than 5 degrees, a light beam branch ratio higher than 20 dB is easily obtained without any necessity for changing or modifying the configuration of the branch portion. Thus, determination of an intersection angle in this way is not acceptable for the optical switch of the invention. When the optical switch constructed in the above-described manner is fabricated and the dimension $L_1$ at the intersection portion is determined to be less than 3 mm, a light beam branch ratio higher than 15 dB can be obtained merely by designing the optical wave guides at the intersection portion in a hyperbolic configuration. Thus, according to the invention, the optical switch of the above-mentioned type can be designed and constructed in smaller dimensions with wider dimensional tolerance than that of the conventional optical switch and thereby an element having good properties in respect to light beam branch ratio and light beam extinction ratio can be produced by utilizing the optical switch of the invention.

Although the principle underlying the operation of the optical switch of the invention has not been sufficiently clarified, it will be readily understood from the foregoing results that a light beam inputted in the lower mode can be introduced into the intersection portion while it is transmitted through the optical wave guide in multi-mode and thereafter it is converted to light beams for transmission in the lower mode which quasi-statically corresponds to expansion of the optical wave guide since the outer peripheral lines extend in the hyperbolic configuration at the intersection portion. Further, it is considered that light beams are transmitted with little occurrence of leakage due to the fact that the optical wave guide has a width in the range of 10 to 40 microns at the central part of the intersection portion, causing natural expansion of transmitted light beams to be reduced. Further, it is considered that the reason why an excellently high light beam branch ratio can be obtained consists in that introduced light beams are transmitted to the optical wave guide as its expansion decreases in the quasi-static manner in quite the same way as when light beams are introduced into the central part of the intersection portion. The optical switch illustrated in FIG. 11 can be produced on a PLZT based thin film structure having a thickness of 0.3 micron by employing the photo-lithographic technique which has been conventionally used in the field of semi-conductor processing. Typically, a load type optical wave guide is formed by way of the steps of vacuum depositing a layer of $Ta_2O_5$ film having a thickness of 0.2 micron on a resist layer by employing the lift method which belongs to the photo-lithographic technique, the resist layer being prepared with the aid of a negative pattern, and the resist layer being removed with acetone. When the so produced optical wave guide is used, light beams are transmitted therethrough while transmission of light beams is confined in the area located below the layer of $Ta_2O_5$ film. In the embodiment illustrated in FIG. 11, the intersection portion having an intersection angle of $\theta_1$ is designed in such a manner that the optical wave guide having a width $W_1$ of 4 microns on the lefthand side of the optical switch, as seen in the drawing, is gradually widened toward the intersection portion which has a width $W_2$ of 40 microns at the central part and an approximate length $L_1$ of 2 mm and it is then gradually narrowed toward the righthand side away from the intersection portion while the outer peripheral lines on both sides are smoothly connected to one another in the hyperbolic configuration. It is confirmed that a light beam introduced into the optical wave guide 11 has a light beam branch ratio of 16 dB in the optical switch of the invention, as constructed in the above-described manner.

INDUSTRIAL APPLICABILITY

As will be readily apparent from the above description, the optical switch of the invention makes it possible to produce a light beam detecting element in the integrated structure and moreover to produce an optical element in very small dimensions without any particular difficulty. Accordingly, a number of optical devices can be easily assembled in the form of an integrated circuit. It can be concluded that the present invention has provided many industrial advantages which can be fruitfully utilized by associated industries.

While the present invention has been described above with respect to typical embodiments, it should of course be understood that it should not be limited to these only but various changes or modifications may be made in any acceptable manner without departure from the spirit and scope of the invention as defined by the appended claims.

What is claimed is:

1. An optical switch of the type including at least an input optical wave guide;
   two branch optical wave guides;
   a pair of transmission control electrodes and a branch portion at which said input optical wave guide is branched into said branch optical wave guides, said input optical wave guide and said branch optical wave guides being made of electro-optical material and said transmission control electrodes being arranged in a spaced relation with a gap having a predetermined width therebetween, said gap being located at any one of the input optical wave guides and the branch optical wave guides in the vicinity of said branch portion so that transmission of light beams through the input optical wave guide and the branch optical wave guide is controlled by applying a predetermined voltage to the transmission control electrodes thereby changing the refractive index of the optical wave guide at the position located below said gap, wherein
   the input optical wave guide and the branch optical wave guide are constituted by a layer of a PLZT ((Pb, La) (Zr, Ti) $O_3$) based thin film which is formed by epitaxial growth on the base plate located on a C-plane of sapphire ($\alpha$-alumina).

2. An optical switch as defined in claim 1, wherein said PLZT based thin film constituting the input optical wave guide and the branch optical wave guides has a mol ratio of Pb/Ti in the range of $0.65 < Pb/Ti < 0.90$.

3. An optical switch as defined in claim 2, wherein the surface of the PLZT based thin film is located on the (111)-plane.

4. An optical switch as defined in claim 1, wherein the PLZT based thin film is formed with a ridge portion which is raised from the surface thereof, said ridge portion constituting the input optical wave guide and the branch optical wave guide.

5. An optical switch as defined in claim 1, wherein the PLZT based thin film is formed with a load layer on the surface thereof, said load layer being made of dielectric material and constituting the input optical wave guide and the branch optical wave guide passages.

6. An optical switch as defined in claim 5, wherein said load layer is constituted by a material selected from a group of dielectric materials comprising titanium oxide, tantalum oxide, niobium oxide, zirconium oxide, zinc oxide, aluminum oxide and silicon nitride.

7. An optical switch of the type including at least an input optical wave guide;
   two branch optical wave guides;
   a pair of transmission control electrodes and a branch portion at which said input optical wave guide is branched into said branch optical wave guides, said input optical wave guide and said branch optical wave guides being made of electro-optical material and said transmission control electrodes being arranged in a spaced relation with a gap having a predetermined width therebetween, said gap being located at any one of the input optical wave guide and the branch optical wave guide in the vicinity of the branch portion so that transmission of light beams through the input optical wave guide and the branch optical wave guides is controlled by applying predetermined voltage to the transmission control electrodes thereby changing the refractive index of the optical wave guide at the position located below said gap, wherein the input optical wave guide and the branch optical wave guides are constituted by a layer of PLZT (((Pb, La) (Zr, Ti) O$_3$) based thin film which is formed by epitaxial growth on a base plate located on a C-plane of sapphire (α-alumina), the branch portion is in the form of a Y-shaped branch by means of which light beams transmitted through the input optical wave guide are equally distributed into the branch optical wave guides which extend parallel with one another and united at another Y-shaped branch located at the outlet ends thereof, an output optical wave guide being jointed to the branch optical wave guides at the last-mentioned Y-shaped branch, and that the transmission control electrodes are located with the one optical wave guide interposed therebetween so that transmission of light beams is controlled by phase interference of transmitted light beams caused by applying said predetermined voltage to the transmission control electrodes.

8. An optical switch as defined in claim 7, wherein the PLZT based thin film constituting the input optical wave guide and the branch optical wave guide has a mol ratio of Pb/Ti which is in the range of $0.65 < Pb/Ti < 0.90$.

9. An optical switch as defined in claim 8, wherein the surface of the PLZT based thin film is located on the (111)-plane.

10. An optical switch as defined in claim 7, wherein the PLZT based thin film is formed with a ridge portion which is raised from the surface thereof, said ridge portion serving to constitute the input optical wave guide and the branch optical wave guides.

11. An optical switch as defined in claim 7, wherein the PLZT based thin film is formed with a load layer on the surface thereof, said load layer being made of dielectric material and serving to constitute the input optical wave guide and the branch optical wave guides.

12. An optical switch as defined in claim 11, wherein said load layer is constituted by a material selected from a group of dielectric materials comprising titanium oxide, tantalum oxide, niobium oxide, zirconium oxide, zinc oxide, aluminum oxide and silicon nitride.

13. An optical switch of the type including at least an input optical wave guide;

two branch optical wave guides;

a pair of transmission control electrodes and a branch portion at which said input optical wave guide is branched into said branch optical wave guides, said input optical wave guide and said branch optical wave guides being made of electro-optical material and said transmission control electrodes being arranged in spaced relation with a gap having a predetermined width therebetween, said gap being located on any one of the input optical wave guides and the branch optical wave guides so that transmission of light beams through the input optical wave guide and the branch optical wave guides is controlled by applying a predetermined voltage to the transmission control electrodes thereby changing the refractive index of the optical wave guide at the position located below said gap, wherein the input optical wave guide and the branch optical wave guides are constituted by a layer of PLZT ((Pb, La) (Zr, Ti) O$_3$) based thin film which is formed by epitaxial growth on the base plate located on a C-plane sapphire (α-alumina), that a second Y-shaped branch is formed by jointing a main optical wave guide to a second branch optical wave guide is jointed to a first optical wave guide, said main optical wave guide being constructed by a combination of the input optical wave guide and the first branch optical wave guide which is formed as an extension from the former, and that the transmission control electrodes are located on the second Y-shaped branch so the light beams transmitted through the main light optical wave guide are transmitted forward through the second Y-shaped branch or totally reflected thereat to the second branch optical wave guide by applying said predetermined voltage to the transmission control electrodes, thereby reducing the refractive index of the second Y-shaped branch at the position located below the gap.

14. An optical switch as defined in claim 13, wherein the PLZT based thin film constituting the input optical wave guide and the branch optical wave guides has a mol ratio of Pb/Ti which is in the range of $0.65 < Pb/Ti < 0.90$.

15. An optical switch as defined in claim 13, wherein the surface of the PLZT based thin film is located on the (111)-plane of sapphire.

16. An optical switch as defined in claim 13, wherein a plurality of leakage control electrodes are arranged in a spaced relation with a second gap having a predetermined width between it and an adjacent one at the boundary area as defined by the main light optical wave guide and the second branch optical wave guide so that a light beam transmitted through the main optical wave guide is transmitted forward further when said predetermined voltage is applied to said leakage control electrodes while said light beam is totally reflected to the second branch optical wave guide when said predetermined voltage is applied to the transmission control electrodes.

17. An optical switch as defined in claim 16, wherein the second gap extends parallel with the first-mentioned gap.

18. An optical switch as defined in claim 16, wherein a second input optical wave guide is provided in the form of an extension from the second branch optical wave guide so as to form a third Y-shaped branch, the widths of the first and second input optical wave guides and the widths of the first and second branch optical wave guides in the vicinity of the third Y-shaped branch increasing toward the central part of the third Y-shaped branch, the outer peripheral lines of the first and second input optical wave guides in the vicinity of the third Y-shaped branch and the first and second branch optical wave guides defining a hyperbolic trace.

* * * * *

UNITED STATES PATENT AND TRADEMARK OFFICE
CERTIFICATE OF CORRECTION

PATENT NO. : 4,715,680

DATED : December 29, 1987

INVENTOR(S) : Takao KAWAGUCHI ET AL.

It is certified that error appears in the above-identified patent and that said Letters Patent is hereby corrected as shown below:

On the Title Page add:

-- [30]     Foreign Application Priority Data

February 10, 1983   [JP]   Japan   20612/83

May 19, 1983        [JP]   Japan   88526/83

July 18, 1983       [JP]   Japan   131238/83  --.

Signed and Sealed this

Twenty-sixth Day of July, 1988

Attest:

DONALD J. QUIGG

Attesting Officer          Commissioner of Patents and Trademarks